United States Patent [19]

Takasu et al.

[11] Patent Number: 5,083,218
[45] Date of Patent: Jan. 21, 1992

[54] HAND-HELD IMAGE READING APPARATUS

[75] Inventors: Akihide Takasu, Fussa; Atsushi Sagisaka, Hino, both of Japan

[73] Assignee: Casio Computer Co., Ltd., Tokyo, Japan

[21] Appl. No.: 477,232

[22] Filed: Feb. 8, 1990

[30] Foreign Application Priority Data

Feb. 8, 1989 [JP] Japan .................................. 1-29287
Jul. 20, 1989 [JP] Japan .................................. 1-188313

[51] Int. Cl.[5] .......................................... H04M 1/024
[52] U.S. Cl. .................................... 358/473; 358/453; 382/59
[58] Field of Search .................. 358/453, 473; 382/48, 382/59

[56] References Cited

U.S. PATENT DOCUMENTS

| | | | |
|---|---|---|---|
| 4,626,925 | 12/1986 | Toyoda | 358/473 |
| 4,717,965 | 1/1988 | Mashiko et al. | 358/473 |
| 4,814,898 | 3/1989 | Arimoto et al. | 358/453 |
| 4,931,880 | 6/1990 | Takada | 358/453 |

Primary Examiner—Edward L. Coles, Sr.
Attorney, Agent, or Firm—Frishauf, Holtz, Goodman & Woodward

[57] ABSTRACT

A hand-held image reading apparatus reads image data corresponding to image information from a surface and prints the image data on a printing medium. The apparatus reads the image data by moving over the surface. Further, the apparatus stores the read image data in an internal memory, extracts the image data existing in the center of the image data stored in the memory and prints only the extracted image data on the printing medium.

20 Claims, 5 Drawing Sheets

HAND-HELD IMAGE READING APPARATUS

BACKGROUND OF THE INVENTION

1. Field of the Invention

The present invention relates to a hand-held image reading apparatus for reading image information from a surface as it moves over the surface, and to a method of operating the apparatus.

2. Description of the Related Art

Various hand-held image reading apparatuses such as hand-held copiers, hand-held image scanners, and the like, have recently been put into practical use. These apparatuses read a predetermined width of image information from a surface, as they move over the surface. Therefore, they can read the part of an image corresponding to the distance they have moved. Some of these apparatuses are capable of changing the width of the reading area.

However, it is difficult for them to read only a single, required line of a document if the line spacing is narrow.

SUMMARY OF THE INVENTION

The present invention has been made in an attempt to solve the above-described problem of the conventional hand-held image reading apparatuses. The object is to provide a hand-held image reading apparatus which can read only a required part of an image, and a method of operating it.

To achieve the above-described object, the present invention provides a hand-held image reading apparatus comprising inputting means for inputting image data in response to a predetermined surface area containing image information memory means for storing the image data inputted by said inputting means extracting means for extracting a set of image data forming one line which exists in the center of image data stored in said memory means and outputting means for outputting the image data detected by said image data detecting means.

The above-described arrangement provides a particular advantage in that image data corresponding to only that part of an image required to be read can be precisely obtained, even if that part comprises only one line of a document with narrow line spacing between the line and adjacent lines and thus even if the not required part of the image as well as the required part of the image are stored in the memory means.

BRIEF DESCRIPTION OF THE DRAWINGS

The object and other novel features of the present invention will become apparent from the following descriptions read in conjunction with the drawings, in which.

DETAILED DESCRIPTION OF THE PREFERRED EMBODIMENT

An embodiment of the present invention will now be described with reference to the accompanying drawings.

Figure 1:
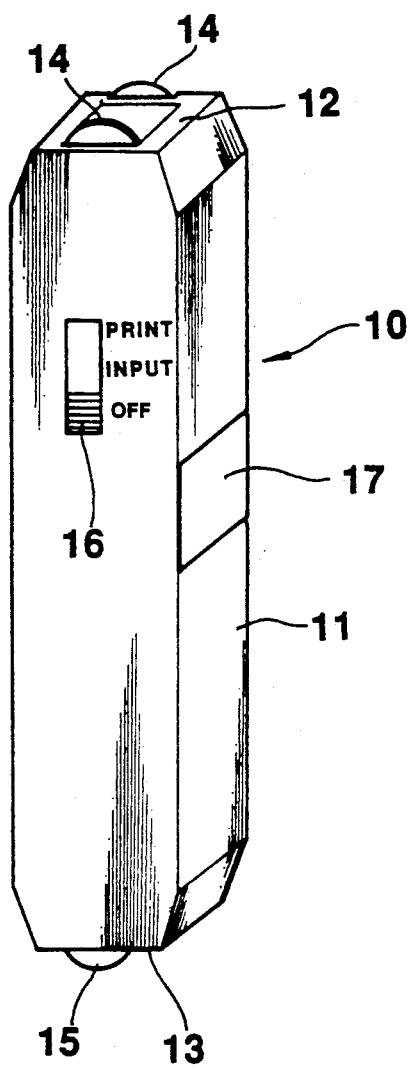
FIG. 1 is a perspective view of a hand-held manually sweepable copier according to a preferred embodiment of the invention.

FIG. 1 shows a perspective view of a hand-held manually sweepable copier according to an embodiment of the present invention. The copier 10 comprises a rectangular housing 11 which is small enough to be held by hand; a reading section 12, provided at one end of the housing 11, for optically reading image information from a surface A; a printing section 13, provided at the other end of the housing 11, for printing the image information read by the reading section 12; rubber rollers 14 and 15, mounted in the housing 11 near the reading section 12 and the printing section 13, respectively, so that they protrude from respective ends of the housing 11; a mode switch 16, mounted on the side surface of the housing 11, for switching between a power source (OFF), a read mode (INPUT) and a print mode (PRINT); and an operation key 17 mounted on the front surface of the housing 11 for starting a read or print operation.

In the read mode (INPUT) set by the mode switch 16, when the housing 11 is moved such that the rollers 14 mounted near the reading section 12 are put into contact with the surface A, image information on the surface A is optically read as image data and stored in an internal memory (described later).

In the print mode (PRINT) set by the mode switch 16, when the housing 11 is moved such that the rollers 15 mounted near the printing section 13 are put into contact with a printing medium B, image data stored in the internal memory is printed on the printing medium B.

Figure 2:
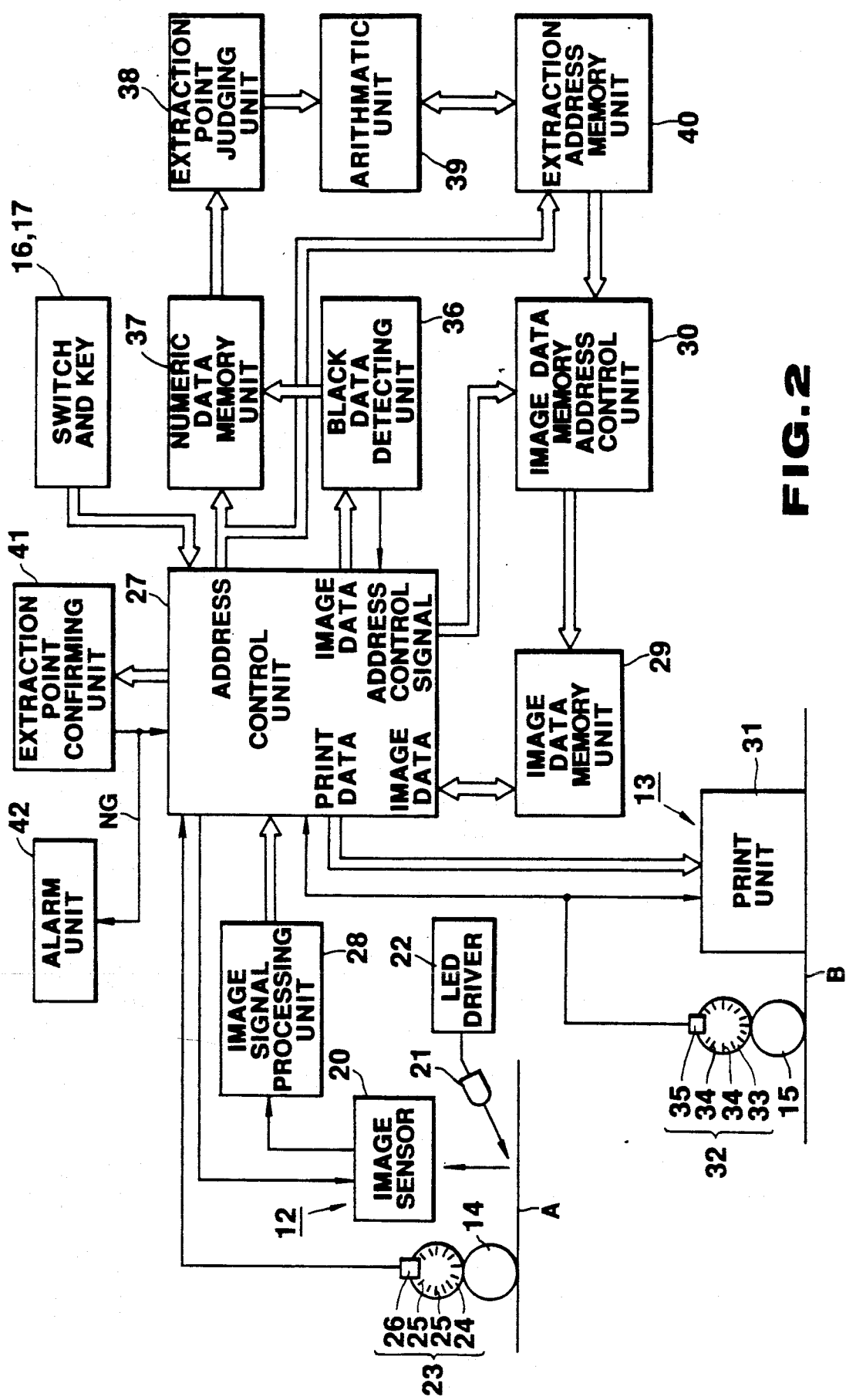
FIG. 2 is a schematic block diagram of the internal arrangement of the hand-held manually sweepable copier shown in FIG. 1.

FIG. 2 shows an arrangement of electronic circuits of the copier 10.

The reading section 12 comprises an image sensor 20, an LED array 21, an LED driver 22 and a reading encoder 23.

Figure 3:
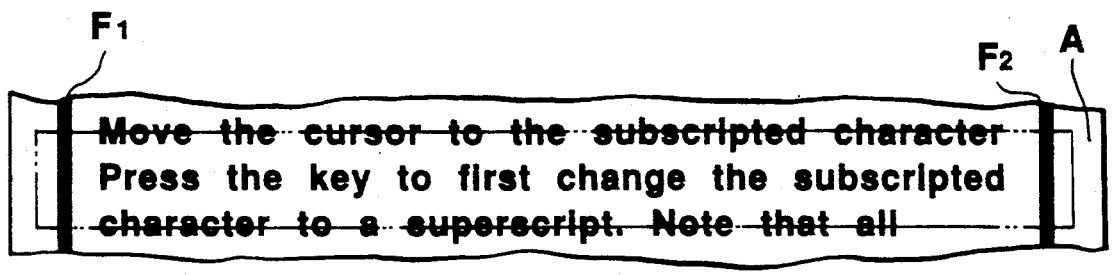
FIG. 3 is a view showing a state in which image information is read by the hand-held manually sweepable copier shown in FIG. 1.

The image sensor 20 is a 64-dot line-type CCD (Couple Charged Device) with a width of 8 mm and a resolution of 8 dots/mm. The longitudinal axis of the image sensor 20 is orthogonal to the direction in which the housing 11 is moved across the surface A. FIG. 3 shows the surface A of a paper which characters are printed and frames F1 and F2 are provided. The LED array 21 comprises a plurality of LEDs and its longitudinal axis is parallel to that of image sensor 20. The LED driver 22 drives the LED array 21 so that it illuminates the surface A. The reading encoder 23 has an encoder disk 24 which has a plurality of slits 25 formed radially at regular intervals, a detector 26 comprising an LED (not shown) and a photosensor (not shown) arranged adjacent to each other at opposing positions with the disk 24 disposed between the LED and the photosensor. The disk 24 is coupled to one of the rollers 14 and is thus rotated by it. The detector 26 is situated so that light emitted from the LED is incident upon its photosensor through the slits 25 of the disk 24. When the disk 24 is rotated by moving the housing 11 such that the rollers 14 are put into contact with the surface A, the light emitted from the LED within the detector 26 is interrupted by the disk 24 at a rate corresponding to the moving speed of the housing 11. Therefore, the detector 26 generates a detecting signal representing the distance through which the housing 11 has been moved. The detecting signal generated by the detector 26 is outputted to a control unit 27 every time the housing 11 is moved through a predetermined distance.

The image sensor 20 generates image signals corresponding to the image information on the surface A illuminated by the LED array 21, and outputs them to an image signal processing unit 28 on the basis of a control signal outputted from the control unit 27. This control signal is based upon the detecting signal outputted from the encoder 23. The image signal processing unit 28 converts the image signals outputted from the image sensor 20 into binary signals (black and white) and outputs the binary signals to control unit 27 in 8 bit parallel as image data.

The image data outputted from the processing unit 28 is stored in an image data memory unit 29 via the control unit 27. In FIG. 3, a rectangular thin line designates that area of the surface A which corresponds to a memory area of the image data memory unit 29 shown in FIG. 4. The image data memory unit 29 comprises a bit-map memory and has a storing area of 64 bits (cells) in the row direction X and 3200 bits (cells) in the column direction Y (shown in FIG. 4). That is, the memory unit 29 is capable of storing image data of 64 * 3200 bits obtained by moving the housing 11 through 400 mm. When the image data outputted from the image signal processing unit 28, is stored in the image data memory unit 29, an image data memory address control unit 30 designates addresses of the memory unit 29 under control of the control unit 27.

The image data stored in the memory unit 29 to be printed on the printing medium B is supplied to a printing unit 31 of the printing section 13. The printing section 13 comprises a printing unit 31 and a printing encoder 32. The printing unit 31 comprises a thermal printing head (not shown), an ink ribbon (not shown) and a head driver (not shown). The encoder 32 is constituted in the same way as the reading encoder 23 and comprises an encoder disk 33 which is rotated by one of the rollers 15. It has a plurality of slits 34 formed radially at regular intervals, and a detector 35. In the print mode (PRINT) set by the mode switch 16, when the housing is moved such that the rollers 15 are put into contact with the printing medium B the printing unit 31, synchronized with a detecting signal outputted from the encoder 32, prints every set of image data stored in a row of the memory unit 29.

Figure 4:
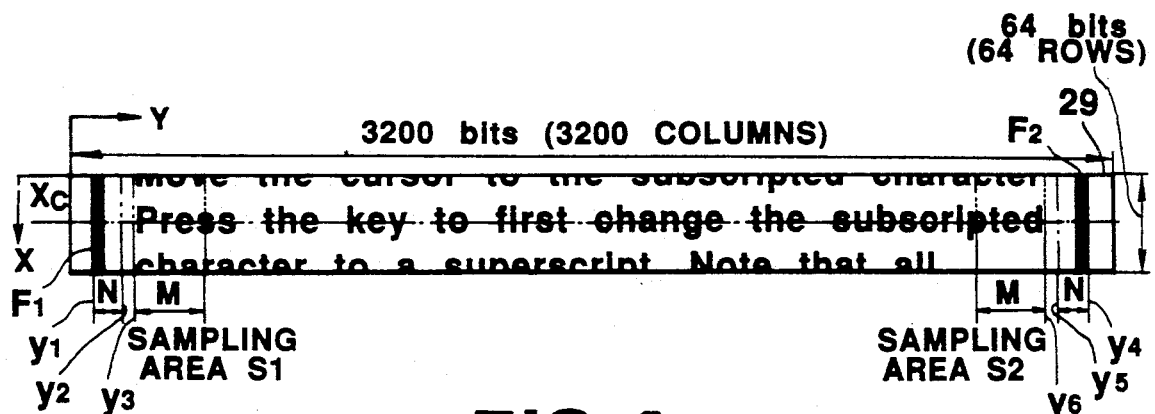
FIG. 4 is a view showing a state in which image data is stored in the image data memory shown in FIG. 2 and a state in which a sampling area is determined by the control unit and the black data detecting unit shown in FIG. 2.
Figure 5:
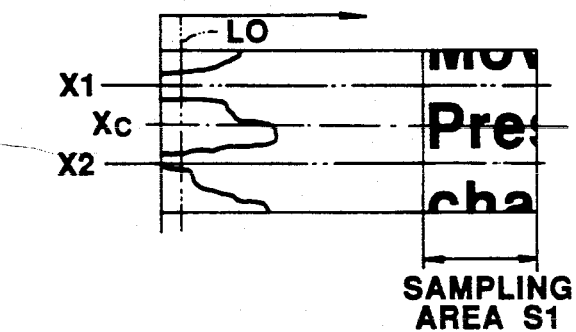
FIG. 5 is a view showing the distribution of black data counted by the black data detecting unit shown in FIG. 2.

Moreover, the image data stored in the image data memory unit 29 is also supplied to a black data detecting unit 36 via the control unit 27. The black data detecting unit 36 detects black data of the image data provided from the memory unit 29 and counts the number of black data stored in each row of the data memory unit 29 in the column direction Y (as shown in FIG. 4 and 5).

When the image data stored in the memory unit 29 is sequentially supplied to the detecting unit 36 from the first column toward the last column, and from that in the last column toward that in the first column, the detecting unit 36, under the control of the control unit 27, detects the first black data of the image data, which corresponds to a black line F1 or F2 representing a frame of the paper and which is stored in the column Y1 and outputs the first black data detecting signal to the control unit 27. When the control unit 27 is supplied with the first black data detecting signal from the detecting unit 36, the control unit 27 increases or decreases an address in the column direction Y by a predetermined number N (shown in FIG. 4), with respect to a row in which the first black data is stored, and sequentially supplies the image data from the memory unit 29 to the detecting unit 36 with regard to the columns Y1 to Y2 or the columns Y4 to Y5, beginning with the column Y2 or Y5 designated by the address increased or decreased by the number N, the detecting unit 36 detects a white data continuing toward the last or the first of columns, respectively. Subsequently, the detecting unit 36 again detects, at column Y3 the first black data of the image data sequentially provided from the memory unit 29 and again outputs a detecting signal to the control unit 27. During second storage of the black data, the control unit 27 counts the predetermined number M of column starting with the column Y3 in which first black data is again detected by the detecting unit 36 and determines sampling areas S1 or S2 based on the number M (shown in FIG. 4). Thereafter, the control unit 27 supplies the image data stored in the sampling areas S1 or S2 to the detecting unit 36. The detecting unit 36 then counts the number of black data in the image data supplied from the memory unit 29 in every column of the memory unit 29. That is, the detecting unit 36 produces distribution data of the number of black data stored in each of the columns with regard to the rows, and included in the sampling areas S1 and S2.

Each data count with respect to each column, obtained by the detecting unit 36, is stored in numerical data memory unit 37. These count data are outputted to extraction point judging unit 38. The judging unit 38 sequentially compares each count data outputted from the numerical data memory unit 37 with a predetermined number L0, with regard to the black data counted from the center row shown by Xc in FIGS. 4 and 5 toward both side rows. Then, the judging unit 38 detects the positions of the rows corresponding to the count data which become less than the predetermined number L0 for the first time and those which become more than the predetermined number L0 for the first time after the count data has been less than the predetermined number L0. Thus, the judging unit 38 obtains the points midway between two positions detected on the basis of the count data with respect to each of the rows on each side of the center row Xc, and determines the row direction addresses of the memory unit 29 corresponding to the obtained points as extraction point addresses x1 and x2, shown in FIG. 5. The extraction point addresses x1 and x2 are determined with respect to each sampling area S1 and S2.

The extraction point addresses x1 and x2 in the sampling areas S1 and S2 determined by the judging unit 38, are outputted to an arithmetic unit 39. The arithmetic unit 39 obtains extraction addresses with respect to the row direction of the image data memory unit 29 in every column. These correspond to lines X1 and X2 shown in FIG. 6 and are obtained by linking the extraction point addresses x1 and x2 in the sampling area S1 with the extraction point address x1 or x2 in the sampling area S2. The extraction addresses obtained by the arithmetic unit 39 are outputted to an extraction address memory unit 40. The extraction addresses stored in the extraction address memory 40 are in turn outputted to the image data memory address control unit 30.

When the address control unit 30, under control of the control unit 27, designates areas of the image data memory unit 29 with addresses before and behind the extraction addresses of the row, the image data stored in the areas of the memory unit 29 designated by the address control unit 30 is supplied to an extraction point confirming unit 41 via the control unit 27. The confirming unit 41 judges if the extraction point is in error by detecting whether or not the black data continuously exists when data is obtained across the extraction line X1 or the extraction line X2 with respect to a particular column among a predetermined number of columns. That is, when the black data continuously exists across the extraction point X1, for example, the extraction point X1 is not considered as existing in the spacing between two adjacent lines and thus, is in error. When the confirming unit 41 judges that the extraction point is in error, the confirming unit 41 outputs an NG signal to drive an alarm unit 42. The alarm unit 42 then indicates that the extraction point is in error.

When the address control unit 30, under control of the control unit 27, designates areas of the image data memory unit 29 with addresses between the top of the row direction address and the extraction address corresponding to the line X1, and between the end of the row direction address and the extraction address corresponding to the line X2 in every column, the control unit 27 outputs white data to memory unit 29 so as to erase the image data stored in the areas of memory unit 29 designated by the address control unit 30 and corresponding characters arranged in the adjacent lines.

The operation of the copier 10 will now be described by referring to FIG. 2.

To read image information such as characters and images from the surface A, an operator sets the mode switch 16 to the read mode (INPUT). Then, a power source is automatically turned on, and the control unit 27 is automatically set in the read mode. Next, he places the housing 11 on the surface A such that the rollers 14 are put into contact with the surface A, and depresses the operation key 17. In this condition, the LED array 21 is driven by the LED driver 22 to illuminate the surface. A. When the housing 11 is manually moved across the surface A which contains image data to be read, the image sensor 12 sequentially receives light reflected from the surface A.

Moreover, the encoder disk 24 is rotated by the roller 14 which is rotated corresponding to the movement of the housing 11. Thus, the control unit 27 receives the detecting signal representing the distance through which the housing 11 has been moved across the surface A, from the encoder 23.

The image sensor 12 generates the image signal in response to the light reflected from the surface A and outputs the image signal corresponding to the detected signal outputted from the encoder 23 to the image signal processing unit 28. The image signal processing unit 28 converts the image signal outputted from the image sensor 12 into binary data (black and white) and outputs the binary data to the control unit 27 in 8-bit parallel as the image data. The image data memory address control unit 30 designates the write-address of the image data memory unit 29 under the control of the control unit 27, which in turn supplies the image data to the memory unit 29, to be stored. In this case, the control unit 27 controls the address control unit 30 to increase the column direction address every time the detected signal is outputted from the encoder 23 and to increase the row direction address as the image data is outputted from the image signal processing unit 28. Then, the control unit 27 awaits the next detected signal outputted from the encoder 23 after the control unit 27 finishes writing the image data in the memory unit 29. This image data corresponds to the image signal outputted from the image sensor in response to one detected signal outputted from encoder 23.

The above-described operation is repeated while the housing 11 is moved. Therefore, the image data in response to the image information such as lines F1, F3 of a frame and words, on the surface A (shown in FIG. 3) over which the housing has been moved, is stored sequentially in the memory unit 29.

Now, the method by which copier 10 extracts the predetermined line of words from the image data read from surface A will be described.

Figure 7:
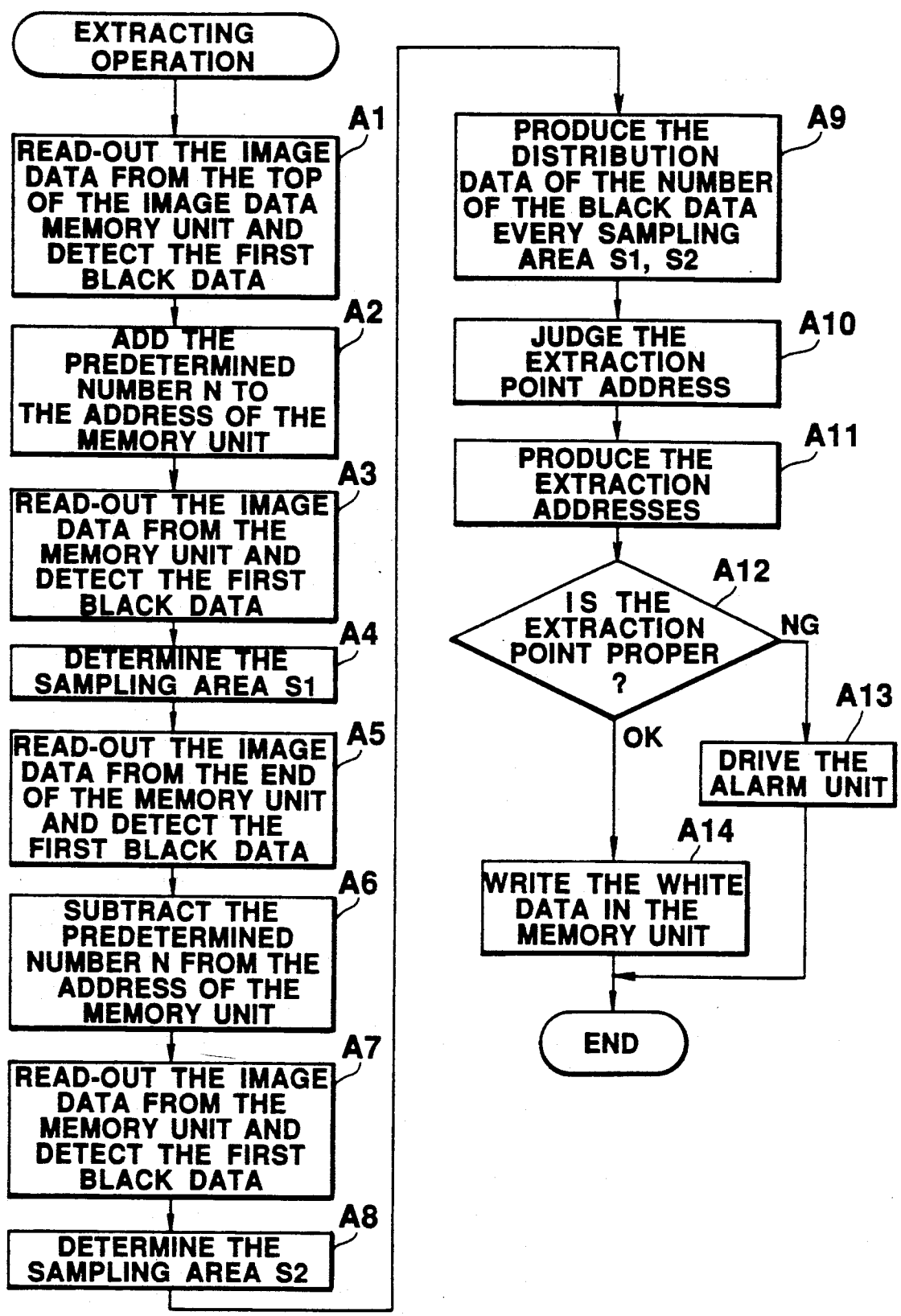
FIG. 7 is a flow chart for explaining an image data extracting process of the hand-held manually sweepable copier shown in FIG. 1.

FIG. 7 shows a flowchart of an operation for extracting a predetermined line of words from the image data stored in the memory unit 27. As shown in FIGS. 3 and 4, when the line spacing on the surface A is narrow, the copier 10 may read the required line as well as neighboring lines. In this case, the required line is extracted by performing this operation.

Firstly, the control unit 27 sequentially supplies the image data stored in the image data memory unit 29 to the black data detecting unit 36, from the top to the bottom of the memory unit 29. The detecting unit 36 detects the first black data in the image data supplied from the control unit 27 (step A1), and outputs the detecting signal to the control unit 27. This is, when the detecting unit 36 detects the black data of image data corresponding to the line F1 of a frame shown in FIG. 4, the detecting signal is output from the detecting unit 36 to the control 27. Subsequently, the control unit 27 adds the address with respect to the column Y1, in which the first black data detected by the detecting unit 36 is stored to the predetermined number N (step A2). Next, the address control unit 30 sequentially designates the area of the memory unit 29 from the address with respect to the column Y2 which is obtained by adding to the predetermined number N toward the end address of the memory unit 29, and the control unit 27 supplies the image data to the detecting unit 36. The detecting unit 36 detects the first black data of the image data obtained from the control unit 27 (step A3) and outputs the detected signal to the control unit 27. The control unit 27 thereby counts a predetermined number M of the column starting with the column Y3 in which the first black data detected by the detecting unit 36 at the second detecting operation thereof, is stored and determines the sampling area S1 based on the number M (step A4).

Meanwhile, the control unit 27 sequentially supplies the image data stored from the bottom to the top of memory unit 29 to the detecting unit 36. The detecting unit 36 detects the first black data of the image data supplied from the control unit 27 (step A5) and outputs the detected signal to the control unit 27. This is, when the detecting unit 36 detects the black data of image data corresponding to the line F2 of the frame shown in FIG. 4, the detecting signal is output from the detecting unit 36 to the control unit 27. Subsequently, the control unit 27 subtracts the predetermined number N from the address with respect to the columns Y4 in which the first black data detected by the detecting unit 36 is stored (step A6). Further, the address control unit 30 under the control of the control unit 27, sequentially designates the area of the memory unit 29 from the address with respect to the column Y5 which is obtained by subtracting the predetermined number N toward the top address of the memory unit 29, and the control unit 27 supplies the image data to the detecting unit 36. Then, the detecting unit 36 detects the first black data of the image data supplied from the control unit 27 (step A7) and outputs the detected signal to the control unit 27.

Thus, the control unit 27 counts a predetermined number M of column starting with the column Y6 in which the first black data detected by the detecting unit 36 in the second detecting operation is stored, and determines the sampling area S2 based on the number M (step A8).

Thereafter, the control unit 27 supplies the image data stored in the area of the memory unit 29 corresponding to the sampling area S1, to the detecting unit 36. The detecting unit 36 counts the black data in the image data supplied from the control unit 27 in every column, and outputs the count data to the numeric data memory unit 37. As a result, the distribution data of the number of black data stored in each of the rows in the sampling area S1, is obtained, as shown in FIG. 5.

Likewise, the control unit 27 supplies the image data which is stored in the area of the memory unit 29 corresponding to the sampling area S2, to the detecting unit 36. The detecting unit 36 counts the black data of the image data supplied from the control unit 27 in every column, and outputs the count data to the numeric data memory unit 37. As a result, the distribution data of the number of black data stored in each of the rows in the sampling area S2 is obtained (step A9).

Subsequently, the count data stored in the numeric data memory unit 37 is supplied sequentially to the extraction point judging unit 38, from the count data with respect to the center row Xc toward that with respect to both side rows. The judging unit 38 detects the positions with respect to the row direction corresponding to the rows on each side of the center row Xc for which the count data is less than the predetermined number L0 and becomes more than the predetermined number L0 after the count data is less than number L0. Further, the judging unit 38 obtains the extraction point addresses x1, X2 corresponding to two points detected on each side of the center column Xc (step A10). The extraction point addresses x1 and x2 are obtained with respect to each sampling area S1 and S2.

Figure 6:
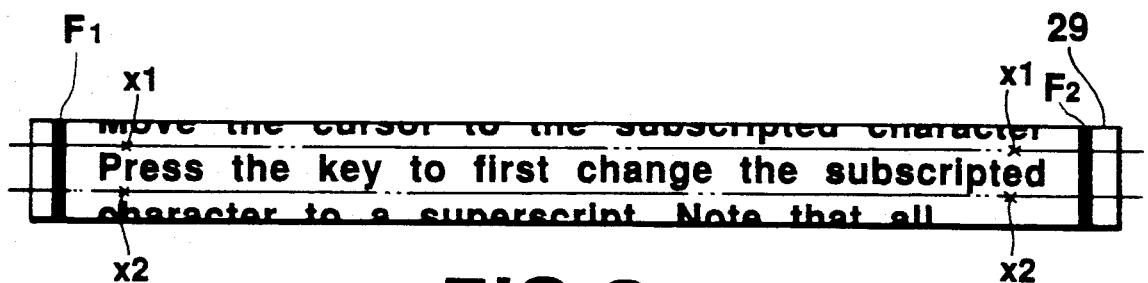
FIG. 6 is a view showing a state in which extraction points are determined by the extraction point judging unit and the arithmetic unit shown in FIG. 2.

The extraction point addresses x1 and x2 with respect to each sampling area S1 and S2 are supplied to the arithmetic unit 39. The arithmetic unit 39 obtains the extraction addresses corresponding to the line obtained by linking the extraction point address x1 between sampling areas S1 and S2 and by linking the extraction point address X2 between the sampling areas S1 and S2. Therefore, the extraction addresses are thereby precisely obtained along the line spacing, even though the line spacing stored in the memory unit 29 is not parallel with the rows of the memory unit 29. The extraction addresses are output to the extraction address memory unit 40 (step A11), as shown in FIG. 6.

Thereafter, the extraction addresses stored in the extraction address memory unit 40 are supplied to the image data memory address control unit 30. The address control unit 30 designates the area of the memory unit 29, under control of the control unit 27, by the addresses before and behind the extraction addresses with respect to the row direction. Then, the image data stored in the area of memory unit 29 designated by the address control unit 30 is supplied to the extraction point confirming unit 41 via the control unit 27. The confirming unit 41 confirms whether or not the extraction addresses are appropriate by detecting whether or not the black data stored in areas designated by the addresses before and behind the extraction addresses is continuous through a predetermined number of the rows (step A12). That is, when the black data stored in areas designated by the addresses before and behind the extraction addresses is continuous through a predetermined number of the rows, the confirming unit 41 judges that the extraction addresses are in error.

If the confirming unit 41 judges that the extraction addresses are in error, it outputs an NG signal to the alarm unit 42 and activates the buzzer (step A13). This completes the extraction operation.

If the confirming unit 41 judges that the extraction addresses are correct, the address control unit 30, under control of control unit 27, designates the areas of the image data memory unit 29 with addresses between the top of the row address and the extraction address, between the extraction address and the end of the row address, in every column direction. Moreover, the control unit 27 writes the white data in the areas of memory unit 29 designated by the address control unit 30, thus erasing the image data stored in the areas of the memory unit 29 which are designated by the address control unit 30 (step A14). As a result, the image data except for the line to be read is erased.

In this manner, since the sampling areas S1 and S2 are determined based on the position of the memory unit 29, in which the black data detected for the second time is stored, the extraction point can be determined based on the image data not of a part of the lines F1 and F2 of the frame but of the words shown in FIG. 4. Therefore, the line to be read can be precisely extracted, because of the exact detection of the space between the lines.

An operation of printing the image data stored in the memory unit 29 will next be described.

To print the image data stored in the memory unit 29, the operator sets the mode switch 16 to the print mode (PRINT), thus automatically setting the control unit in print mode. When the housing is placed on the printing medium B such that the rollers 15 are in contact with the surface of the printing medium B, the thermal printing head is put into contact with the surface of the printing medium B with the ink-ribbon interposed. Then, the operator moves housing 11 over the printing medium B with the operation key 17 depressed.

Meanwhile, the encoder disk 33 is rotated by the rollers 15 according to the movement of the housing 11. The encoder 32 outputs the detecting signal representing the distance through which the housing has been moved in response to the rotation of the encoder disk 33.

The address control unit 30 designates the area of the memory unit 29 under the control of the control unit 27, and the control unit 27 supplies the image data stored in the memory unit 29 to the print unit 31 in response to the detecting signal outputted from the encoder 32. The print unit 31 prints the image data supplied from the control unit 27 on the printing medium B for every set of image data stored in one row, being synchronized with the detecting signal outputted from the encoder 32.

Another embodiment of the extracting operation is described below by referring to FIG. 8.

In the extracting operation described above, the number L0 with which the count data is compared to detect the extraction point is predetermined.

However, in this embodiment, minimum numbers L1 and L2 of the black data are detected with respect to the rows on each side of the center row Xc, by the detecting unit 36. Further, the control unit 27 produces numbers L01 and L02 with which the count data with respect to each of rows on each side of the center row Xc is compared, by adding the predetermined number to the minimum number L1, L2, respectively.

Figure 8:
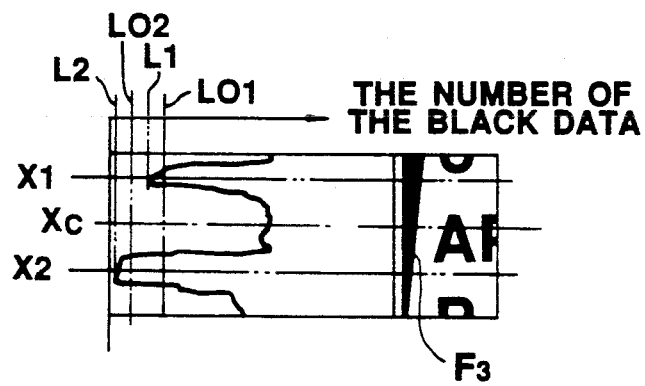
FIG. 8 is a view showing a state in which an extraction point is determined in another way by the control unit and the black data detecting unit shown in FIG. 2.

Therefore, since the numbers with which the count data are compared are different from those on each side of the center row, even though the black frame mark zone F3 whose width is reduced from the upper position to the lower position exists across the row direction in sampling area S1 or S2 and even though the numbers of the black data on each side of the center row Xc are different, as shown in FIG. 8, the extraction point can be precisely detected.

In the embodiments described above, image data corresponding to one line of the words can be extracted from whole image data stored in the memory unit 29. Likewise, image data corresponding to a plurality of the lines of the words can also be extracted from whole image data stored in the memory unit 29. In this case, the extraction operation is performed based on the least and largest extraction addresses with respect to the column direction.

What is claimed is:

1. An image data processing apparatus, comprising:
   inputting means for inputting image data in response to a predetermined area of a material having image information thereon;
   memory means for storing the image data inputted by said inputting means;
   counting means for counting the number of a predetermined kind of data of the image data stored in said memory means;
   determining means for determining a space between a set of image data existing in a middle portion of the image data stored in said memory means and another set of image data stored in said memory means based on a result obtained by said counting means;
   extracting means for extracting said set of the image data existing in the middle portion of the image data with respect to the space determined by said determining means; and
   outputting means for outputting said set of image data extracted by said extraction means.

2. The image data processing apparatus of claim 1, wherein
   said memory means includes a plurality of storing cells arranged in rows and columns;
   said counting means includes means for counting the number of predetermined kind of data of the image data stored in one of the rows and columns of said memory means; and
   said determining means includes:
   comparing means for comparing the number of image data counted by said counting means with a reference number and,
   detection means for detecting one of the rows and columns in which the space between the set of image data exists in the middle portion of the image data stored in said memory means and the other set of image data stored in said memory means, based on a result obtained by said comparing means.

3. The image data processing apparatus of claim 2, wherein
   said comparing means sequentially compares the number of image data with the reference number from the number of image data with respect to the center of a row and column toward that with respect to each side one of a row and column, and includes means for detecting points of said memory means with respect to another one of row and column directions on both sides of the center of said memory means corresponding to the number of image data which is less than the reference number the first time, and which is thereafter more than the reference number; and
   said detection means includes means for determining a point in the center between said two points detected by said comparing means for each side of the center of said memory means with respect to another one of the row and column directions, as an extraction point.

4. The image data processing apparatus of claim 2, wherein said comparing means includes reference number determining means for detecting a minimum number of the image data counted by said counting means and for determining the reference number based on the minimum number.

5. The image data processing apparatus of claim 1, wherein said inputting means includes image sensing means for producing binary data representing black and white, corresponding to the image information on the material; and wherein:
   said memory means stores the binary data produced by said image sensing means; and
   said counting means counts the number of binary data representing one of black and white data.

6. The image data processing apparatus of claim 1, further comprising housing means provided for at least said inputting means, for moving said inputting means on a surface of said material; and wherein:
   said inputting means includes image sensing means having a sensing area of predetermined width extended in a direction orthogonal to that in which said inputting means is moved, for producing the image data corresponding to the image information on the surface over which said inputting means has been moved by said housing means.

7. The image data processing apparatus of claim 6, wherein:
   said determining means includes means for determining a space between a set of image data existing in the middle portion with respect to the direction in which said sensing area of said image sensing means is extended and other sets of image data existing in the direction in which said sensing area of said image sensing means is extended, based on a result obtained by said counting means.

8. The image data processing apparatus of claim 7, wherein said memory means includes a plurality of storage cells arranged in rows and columns and stores each image data produced by said image sensing means corresponding to said sensing area, into said storage cells in every row;

said counting means includes means for counting the number of predetermined kinds of data of the image data stored in each row of said memory means; and said determining means includes:

comparing means for comparing the number of image data counted by said counting means with a reference number; and detection means for detecting the row in which the space between the set of image data existing in the center of the column direction of said memory means and other sets of the image data existing in the column direction of said memory means, based on a result obtained by said comparing means.

9. The image data processing apparatus of claim 8, wherein said comparing means sequentially compares the number of image data with the reference number from the number of image data with respect to the center row toward that with respect to each side row, and includes means for detecting points of said memory means with respect to the column direction, corresponding to the number of image data which are less than the reference number the first time, and which are thereafter more than the reference number, on both sides of the center of said memory means with respect to the column direction; and said detection means includes means for determining a center point between said two points detected by said comparing means on both sides of the center of said memory means with respect to the column direction, as an extraction point.

10. The image data processing apparatus of claim 9, wherein said comparing means includes reference number determining means for detecting a minimum number of image data counted by said counting means and determining the reference number based on this minimum number.

11. The image data processing apparatus of claim 7, wherein said inputting means includes binary data producing means for producing binary data representing black and white from the image data produced by said image sensing means;

wherein said memory means stores the binary data produced by said binary data producing means; and said counting means counts the number of binary data representing one of black and white.

12. The image data processing apparatus of claim 6, wherein said housing means moves on the surface to be read, so as to move said inputting means on the surface to be read.

13. The image data processing apparatus of claim 12, wherein said housing means is manually moved on the surface to be read.

14. A method of operating an image data processing apparatus which includes a memory means, the method comprising the steps of:

inputting image data in response to a predetermined area of a surface containing image information thereon;

storing the inputted image data into said memory means;

counting the number of a predetermined kind of data of the image data stored in said memory means;

determining a space between a set of image data existing in a middle portion of the image data stored in the memory means based on a result obtained by said counting step;

extracting the image data existing in the middle portion of the image data with respect to the space; and outputting the image data extracted by said extracting step.

15. The method of claim 14, wherein said memory means includes a plurality of storing cells arranged in rows and columns; and said counting step includes the step of:

counting the number of a predetermined kind of the image data stored in each row and each column of said memory means; and wherein said determining step includes the steps of:

comparing the number of image data with a reference number; and detecting one row and column in which a space exists between the set of image data existing in the middle portion of the image data stored in said memory means and another set of image data stored in said memory means, based on a result obtained by said comparing step.

16. The method of claim 15, wherein said comparing step includes the steps of;

sequentially comparing the number of image data with the reference number from the number of image data with respect to the center one of the row and the column toward that with respect to each side one of the row and column, judging points of said memory means with respect to another one of the row and column directions on both sides of the center of said memory means with respect to another one of the row and column direction corresponding to the number of the image data which is less than the reference number the first time, and thereafter more than the reference number; and wherein said detecting step includes the step of:

determining a point at the center between said two points detected by said comparing step for each side of the center of said memory means with respect to another one of the row and the column directions, as an extraction point.

17. The method of claim 15, wherein said comparing step includes the steps of:

detecting a minimum number of image data; and determining the reference number based on said minimum number.

18. The method of claim 14, wherein:

said image data processing apparatus includes image sensing means having a sensing area of predetermined width and housing means provided for at least said image sensing means for moving said image sensing means; and said determining step includes the step of:

determining the space between a set of image data existing in a middle portion with respect to a direction in which said sensing area of said image sensing means is extended and another set of image data existing in the direction in which said sensing area of said image sensing means is extended, based on a result obtained by said counting step.

19. The method of claim 18, wherein:

said memory means includes a plurality of storing cells arranged in rows and columns and stores each image data produced by said image sensing means corresponding to said sensing area, into said storing cells in every row;

said counting step includes the step of counting the number of the predetermined kind of image data stored in each of a number of rows of said memory means; and wherein:

said determining steps include the steps of:

comparing the number of image data with a reference number; and detecting the row of said memory means in which the space between the set of image data existing in the middle portion of a column direction of said memory means and another set of image data existing in the column direction of said memory means, based on a result obtained by said comparing step.

20. The method of claim 19, wherein said comparing step includes the steps of:

sequentially comparing the number of image data with the reference number from the number of the image data with respect to the center row toward that with respect to each side row; and judging points of said memory means with respect to the rows on both sides of the center of said memory means, in response to the number of image data which is less than the reference number for the first time, and which is thereafter more than the reference number, every side of the center of said memory means with respect to the column direction; and wherein said detection step includes the step of:

determining the center point between said two points detected by said comparing step for each side of center of said memory means with respect to the column direction, as an extraction point.

* * * * *